US011847240B2

(12) United States Patent
Kassa et al.

(10) Patent No.: US 11,847,240 B2
(45) Date of Patent: Dec. 19, 2023

(54) SYSTEM AND METHOD FOR MATCHING, GROUPING AND RECOMMENDING COMPUTER SECURITY RULES

(71) Applicant: VMware, Inc., Palo Alto, CA (US)

(72) Inventors: Debessay Fesehaye Kassa, Santa Clara, CA (US); Zhen Mo, Sunnyvale, CA (US); Patrick Charles Upatham, Milton, MA (US)

(73) Assignee: VMware, Inc., Palo Alto, CA (US)

( * ) Notice: Subject to any disclaimer, the term of this patent is extended or adjusted under 35 U.S.C. 154(b) by 411 days.

(21) Appl. No.: 17/112,266

(22) Filed: Dec. 4, 2020

(65) Prior Publication Data

US 2022/0179983 A1 Jun. 9, 2022

(51) Int. Cl.
*H04L 29/06* (2006.01)
*G06F 21/62* (2013.01)
*G06F 16/901* (2019.01)

(52) U.S. Cl.
CPC ...... *G06F 21/6209* (2013.01); *G06F 16/9027* (2019.01)

(58) Field of Classification Search
CPC ............. G06F 21/6209; G06F 16/9027; G06F 21/6218; G06F 16/2246; G06F 16/322
See application file for complete search history.

(56) References Cited

U.S. PATENT DOCUMENTS

2012/0284795 A1* 11/2012 Durie ...................... G06F 21/55 726/22
2016/0041996 A1* 2/2016 Prinz, III .............. G06F 16/214 707/827
2017/0353459 A1* 12/2017 Lawrence ........... H04L 63/0263

* cited by examiner

*Primary Examiner* — Evans Desrosiers
(74) *Attorney, Agent, or Firm* — Kim & Stewart LLP

(57) ABSTRACT

A method of generating relevant security rules for a user includes the steps of: building a first tree data structure from paths within a pool of security rules; collecting process paths for the user; and compiling the relevant security rules for the user by traversing the first tree data structure according to the process paths of the user.

20 Claims, 12 Drawing Sheets

```
class TreeNode:
   def __init__(self, p_token):
      self.cnt = 1
      self.token = p_token
      self.child = dict()

class PathTree:
   def _init__(self, p_token):
      self.rule_of = dict()
      self.tree_node = TreeNode(p_token)

   def build_tree(self, proc_path):
      # Create children
      proc_path_tokens = proc_path.split("\\")
      num_tokens = proc_path_tokens.__len__()
      # Add the proc_path to the tree in reverse order
      cur_node = self.tree_node
      for i in range(0, num_tokens):
         token = proc_path_tokens[num_tokens - 1 - i]
         if cur_node.child.get(token) is not None:
            cur_node.child.get(token).cnt += 1
         else:
            new_node = TreeNode(token)
            cur_node.child[token] = new_node
         cur_node = cur_node.child[token]
```

910 (class TreeNode)

920 (class PathTree)

930 (def _init__)

940 (def build_tree)

FIGURE 9

```
proc_path_tokens = proc_path.split('\\')  # Tokenize proc_path from org policy data
num_tokens = proc_path_tokens.__len__()  # Number of proc_path tokens
cur_node = self  # Set current node to root node of the rule path tree
rule_subject = ""  # Initialize the rule_subject to empty string
dbl_str_in_path = False  # Set double-star found flag to false
path_of = dict()  # Forms selected path from the tree parsing
path_of[rule_subject] = True  # We set the path we have so far to true
path_str_node = (rule_subject, cur_node, dbl_str_in_path)
path_queue = []
path_queue.append(path_str_node)  # Enqueue this node to parse its children in the next iteration
next_path_queue = []  # To store next nodes while working on current queue
```

```
for i in range (0, num_tokens):
  token = proc_path_tokens[num_tokens-1-i] # Start with last token
  if next_path_queue:
    path_queue = next_path_queue.copy() # Start with next path tree level queue
  while path_queue:
    cur_node_of_path = path_queue.pop() # Get current node from the queue
    (cur_path, cur_node, dbl_str_in_path) = cur_node_of_path
    next_match_found = False # Re-initialize
    if dbl_str_in_path and i < num_tokens - 1: # If double-star flag is set
      next_path_queue.append(cur_node_of_path) # Next node may find a match down the token path
      next_match_found = True # This is a double-star match
    fuzzy_token_part = token.split(" ")[0] + "**"
    for tkn in [token, '*', '**', '*:', token + '*', fuzzy_token_part]: # Branch on each of these matches
      if tkn in cur_node.child:
        next_match_found = True
        next_match_path = tkn + '\\' + cur_path # Update the rule path
        if cur_path == "":
          next_match_path = tkn # Rule path initialization
        next_match_node = cur_node.child[tkn] # Move down the path tree
        path_of[next_match_path] = True # Record path formed so far
        if tkn == '**':
          dbl_str_in_path = True
        next_match_path_node = (next_match_path, next_match_node, dbl_str_in_path)
        next_path_queue.append(next_match_path_node) # Enqueue to explore their children in next round
    if next_match_found or (not next_match_found and len(cur_node.child) > 0):
      if cur_path in path_of:
        del path_of[cur_path] # Remove the old path without the current token
```

```
group_path_tree = PathTree("root")
rule_path_group_info = dict()
selected_group_rule_path = []
```

1220

```
for rl_path in rule_path_list:
    # Build a tree from the rule path
    group_path_tree.build_tree(rl_path)
    # Initialize the aggregator (selector group) dictionary
    # with list of rule paths contained in a rule path group
    # and the rule path flag showing the rule path is not initially
    # contained in any other rule path
    rule_path_group_info[rl_path] = [[], False]
```

1230

```
for rl_path in rule_path_group_info:
    # Get the matches for this rule path
    gr_pm_list = group_path_tree.find_path_in_tree(rl_path)
    for gr_rp in gr_pm_list:
        if gr_rp in rule_path_group_info:
            rule_path_group_info[gr_rp][0].append(rl_path)
    # If a path tree match is found for a rule path and if that match
    # is different from the rule path, the rule path is
    # in a wider rule path group.
    # So it cannot represent the group, so mark it to exclude from selection.
    if not rule_path_group_info[rl_path][1] and gr_rp != rl_path:
        rule_path_group_info[rl_path][1] = True
```

1240

```
for rpk in rule_path_group_info:
    if not rule_path_group_info[rpk][1]:
        selected_group_rule_path.append(rule_path_group_info)
```

FIGURE 12

SYSTEM AND METHOD FOR MATCHING, GROUPING AND RECOMMENDING COMPUTER SECURITY RULES

BACKGROUND

Securing an individual's digital assets involves securing both the individual's on-premise and cloud computers. To secure the computers, a security company may write security rules that determine what the computers are allowed and not allowed to do. Usually, security companies write rules manually. However, this manual approach does not scale well.

For example, a security company may support devices for thousands of users, each device running several applications. Different users run different applications, and rules that are relevant for one user may not be relevant for another user. For example, a rule may be written specifically for a particular document management software. As such, this rule may be relevant for a user that runs this particular document management software, but irrelevant for a user that does not. Because of such discrepancies, manually writing rules for a large number of users is time-consuming and difficult.

SUMMARY

In one or more embodiments, to automate the process of recommending relevant security rules to a user, a recommendation console may be implemented that collects the process paths used by a user's applications. The recommendation console may then compare the collected process paths to a large pool of security rules. Based on the collected process paths, the recommendation console may select and recommend only those rules that are relevant for a particular user.

In one embodiment, a method of generating relevant security rules for a user includes the steps of: building a first tree data structure from paths within a pool of security rules; collecting process paths for the user; and compiling the relevant security rules for the user by traversing the first tree data structure according to the process paths of the user.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 9 is an example of Python code that may be executed by a recommendation console to build a tree data structure, according to an embodiment.

FIG. 10 is an example of Python code that may be executed by a recommendation console to initialize parameters for generating relevant rules, according to an embodiment.

FIG. 11 is an example of Python code that may be executed by a recommendation console to generate a rule path for a relevant rule from a tree data structure and list of user process paths, according to an embodiment.

FIG. 12 is an example of Python code that may be executed by a recommendation console to build a tree data structure from a list of relevant rules, mark the tree data structure, and generate a list of non-overlapping rule paths from the marked tree data structure, according to an embodiment.

DETAILED DESCRIPTION

Figure 1:
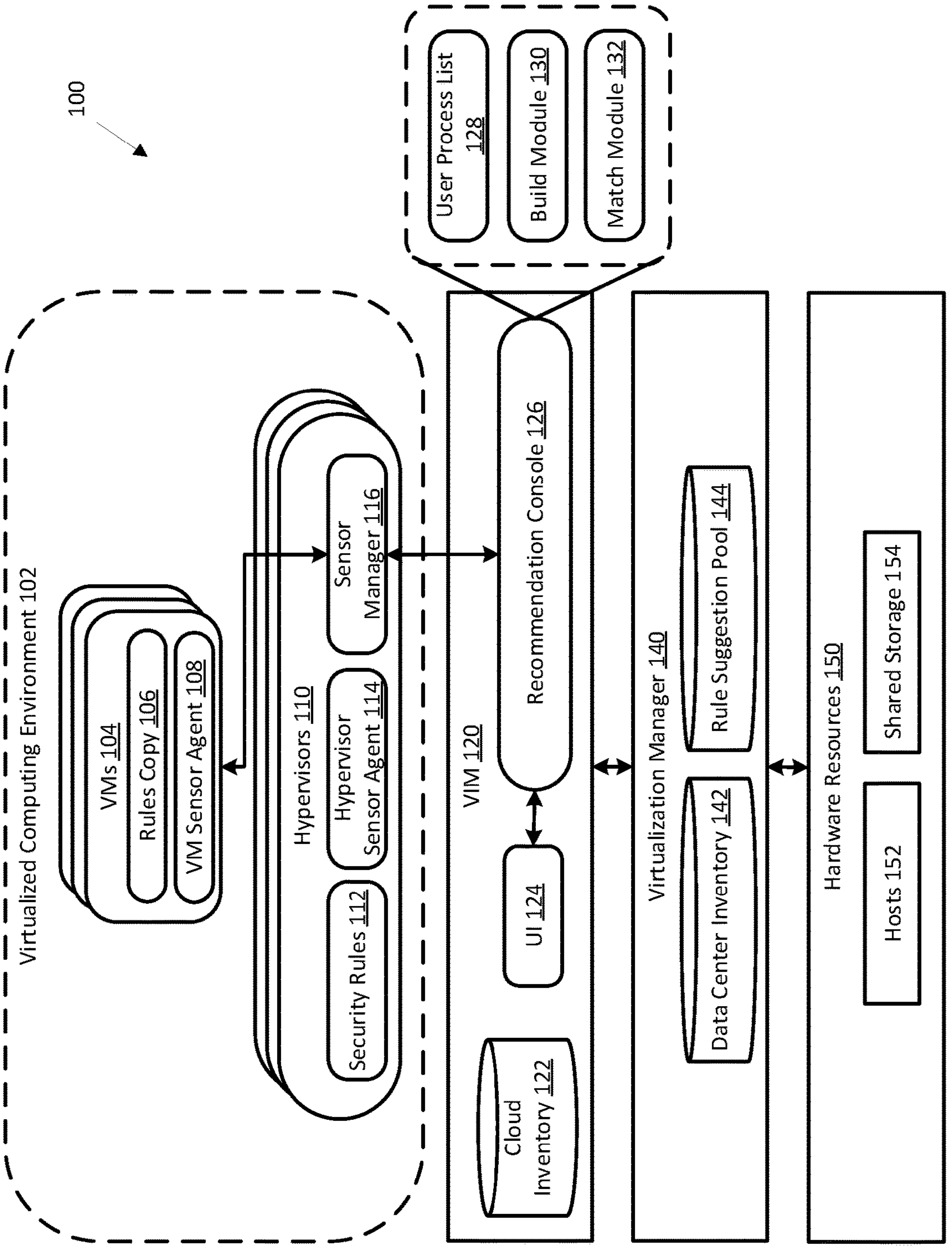
FIG. 1 is a block diagram of a computing environment in which relevant security rules for a user may be generated, according to embodiments.

FIG. 1 is a block diagram of a cloud computing environment in which relevant security rules for a user may be generated, according to embodiments. Cloud computing environment 100 includes a virtualized computing environment for a plurality of users, a virtualized infrastructure manager (VIM) 120, a virtualization manager 140, and hardware resources 150.

Hardware resources 150 include hosts 152 and shared storage 154. Hosts 152 are servers that may be constructed on server grade hardware platforms such as x86 architecture platforms. Hosts 152 comprise hardware platforms that include central processing units (CPUs), system memory such as random-access memory (RAM), and network interface controllers (NICs).

Hosts 152 access shared storage 154 through their NICs. In another embodiment, each host 152 contains a host bus adapter (HBA) for sending input/output operations (IOs) to shared storage 154. Shared storage 154 may comprise, e.g., magnetic disks or flash memory in a storage area network (SAN). In other embodiments, hosts 152 also contain local storage devices, such as hard disk drives (HDDs) or solid-state drives (SSDs), which may be aggregated and provisioned as a virtual storage area network (VSAN) device.

Virtualized computing environment 102 is a particular user's virtualized computing environment in cloud computing environment 100. Each host 152 runs a hypervisor 110 and virtual machines (VMs) 104 in virtualized computing environment 102. A hypervisor 110 is a virtualization software layer that supports a VM execution space for concurrently instantiating and executing VMs 104. VMs 104 are the user's virtual compute resources.

Each VM 104 comprises a security rules copy 106 and a VM sensor agent 108. Security rules copy 106 is a copy of security rules 112 received from a hypervisor 110. The rules in security rules copy 106 and security rules 112 define what operations the VMs 104 and hypervisors 110 are allowed to perform. In the embodiment of FIG. 1, each of VMs 104 and hypervisors 110 apply the same rules. However, in other embodiments, VMs 104 and hypervisors 110 may apply rules that are specific to those VMs 104 and hypervisors 110. VM sensor agent 108 is a software module that detects which processes VM 104 runs. VM sensor agent 108 also applies the rules from security rules copy 106 to allow VM 104 to perform certain operations and to deny others.

Each hypervisor 110 comprises security rules 112, a hypervisor sensor agent 114, and a sensor manager 116. Hypervisor sensor agent 114 is a software module that detects which processes hypervisor 110 runs. Hypervisor sensor agent 114 also applies security rules 112 to allow hypervisor 110 to perform certain operations and to deny others. Sensor manager 116 is a software module that communicates with the VMs 104 in the execution space supported by hypervisor 110. Sensor manager 116 collects the processes each VM 104 runs and stores a security rules copy 106 in each VM 104. Sensor manager 116 also communicates with a recommendation console 126 to transmit processes run by VMs 104 and hypervisors 110. Sensor manager 116 also receives rules to store in security rules 112 from recommendation console 126. Recommendation console 126 will be discussed further below.

Security rules may include blocking and permission rules that take the form of (subject, operation, action) tuples. The subject of a blocking or permission rule is a rule path. The operation of a blocking or permission rule is a type of operation that the subject is capable of performing. The action of a blocking or permission rule is a determination of whether the subject is allowed to perform the operation, e.g., "deny" or "allow."

An example of a blocking rule is: "\powershell.exe MEMORY_SCRAPE DENY." According to the example blocking rule, any process path that belongs to a set of paths defined by the subject "\powershell.exe" is not allowed to perform the operation "MEMORY_SCRAPE." An example of a permission rule is "c:\program files***\googleupdate.exe* MEMORY_SCRAPE ALLOW." According to the example permission rule, any process path that belongs to a set of paths defined by the subject "C:\program files***\googleupdate.exe*" is allowed to perform the operation "MEMORY_SCRAPE."

In addition to blocking and permission rules, security rules may include reputation rules that take the form of (subject, reputation) tuples. The subject of a reputation rule is a rule path. The reputation of a reputation rule is a determination of whether the subject should be allowed to execute, e.g., "whitelist" or "blacklist." An example of a first reputation rule is: "C:\program files\windows defender WHITELIST." According to the first reputation rule, any process path that belongs to a set of paths defined by the subject "C:\program files\windows defender" is allowed to execute. An example of a second reputation rule is: "\program files (x86)\microsoft office BLACKLIST." According to the second reputation rule, any process path that belongs to a set of paths defined by the subject "\program files (x86)\microsoft office" is not allowed to execute.

Virtualization manager 140 is a physical or virtual server that communicates with the hypervisor 110 of each host 152 to provision virtual compute, storage, and network resources, including VMs 104, from hardware resources 150. Virtualization manager 140 contains a data center inventory 142 and a rule suggestion pool 144.

Data center inventory 142 an inventory of the virtual compute, storage, and network resources of data center 100. Virtualization manager 140 stores IDs of instantiated VMs and virtual disks of VMs in data center inventory 142, including VMs 104 and virtual disks of VMs 104. Rule suggestion pool 144 is a list of rules from which rules that are relevant to the user are generated. The rules of rule suggestion pool 144 may be, e.g., collected from all existing customers of a security company. The rules may also be collected from other sources.

VIM 120 is a physical or virtual server that partitions the virtual compute, storage, and network resources provisioned by virtualization manager 140, for different tenants. VIM 120 contains a cloud inventory 122, a user interface (UI) 124, and recommendation console 126. Cloud inventory 122 is an inventory of the virtual compute, storage, and network resources for each of the tenants of data center 100. Virtualization manager 140 transmits IDs of instantiated VMs and virtual disks to VIM 120, including the IDs of VMs 104 and virtual disks of VMs 104. After receiving the IDs, VIM 120 stores the IDs in cloud inventory 122 and associates the IDs with tenants of data center 100.

UI 124 is a UI that allows the user to interface with recommendation console 126. Recommendation console 126 is a device that generates rules that are relevant for the user. For example, the reputation rule "C:\program files\windows defender WHITELIST" is relevant if VMs 104 execute the program "Windows Defender." However, if VMs 104 do not execute the program "Windows Defender," then this reputation rule is not relevant for the user, and recommendation console 126** will not recommend this reputation rule to the user.

The process of generating recommendations is triggered by the user transmitting a request via UI 124 to recommendation console 126 for new recommendations. After receiving the request, recommendation console 126 transmits a request for the user's process paths to the sensor managers 116 of hypervisors 110. In turn, each sensor manager 116 retrieves from the VMs 104 supported by the associated hypervisor 110 the process paths detected by the VM sensor agents 108. Each sensor manager 116 then retrieves from hypervisor sensor agent 114 the process paths detected for the associated hypervisor 110. Each sensor manager 116 then transmits the detected process paths for VMs 104 and hypervisor 110 to recommendation console 126. After receiving all the process paths from each sensor manager 116, recommendation console stores the process paths as user process list 128.

After storing user process list 128, recommendation console 126 retrieves the rules of rule suggestion pool 144 from virtualization manager 140. Using the rule paths of rule suggestion pool 144, build module 130 builds a first tree data structure and hash map according to the process of FIG. 2. Then, using the first tree, hash map, and user process list 128, match module 132 generates relevant rules according to the process of FIG. 3.

Figure 3:
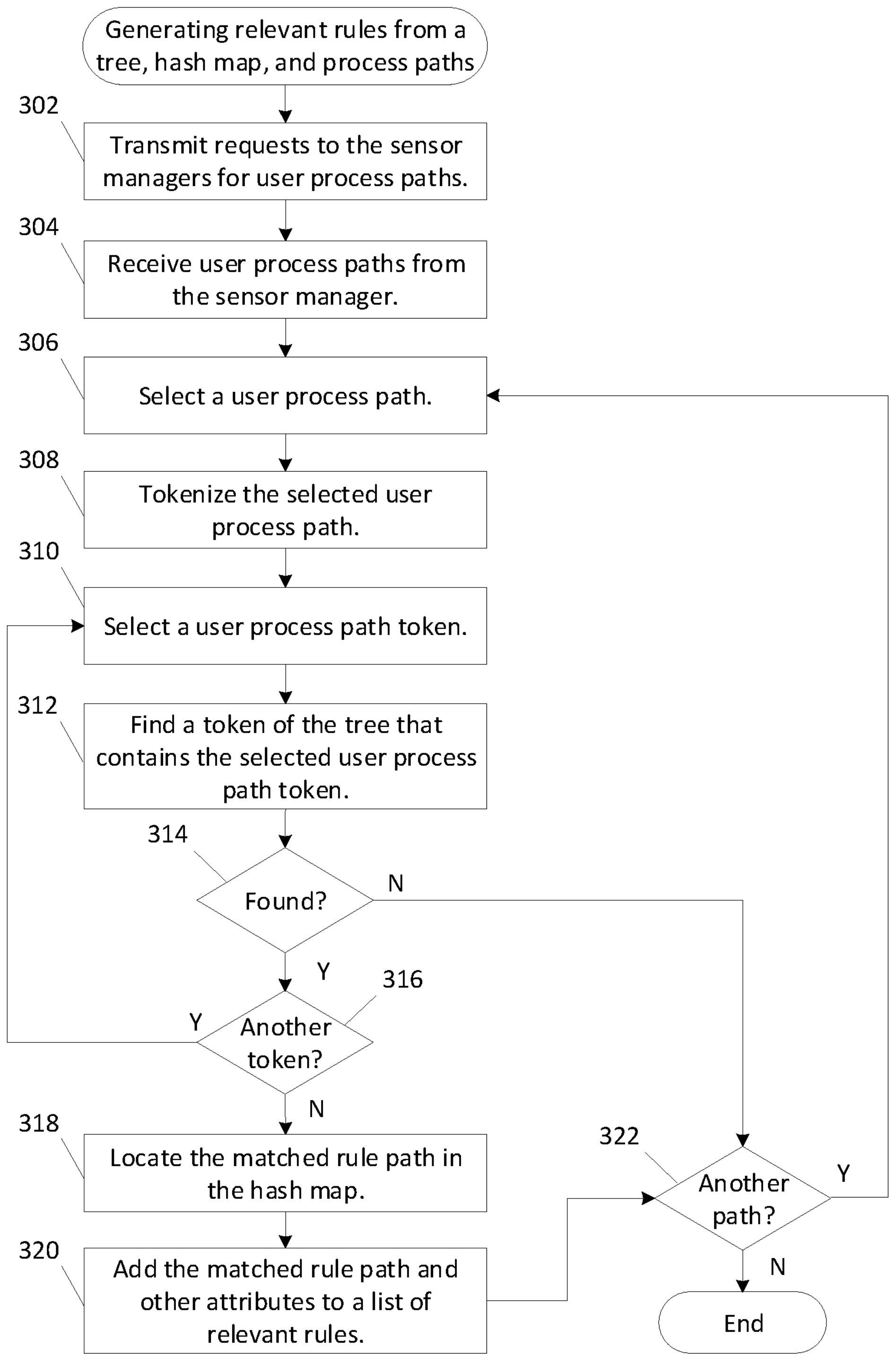
FIG. 3 is a flow diagram of steps carried out by a recommendation console to generate relevant rules from a tree data structure, hash map, and list of user process paths, according to an embodiment.

Because of wildcards, while the rules generated according to the process of FIG. 3 are relevant to the user, there may be overlap within the process paths. A single "*" character is a wildcard that contains any path directory. Two "*" characters may contain any number of path directories. For example, the generated rules may include a first relevant rule "C:\program files\websense WHITELIST" and a second relevant rule "C:\program files\websense\websense endpoint WHITELIST." Because of wildcards, the rule path portion "websense endpoint" from the second relevant rule belongs to a set of rules defined by the rule path portion "" from the first relevant rule. As a result, all of the rules defined by the subject of the second relevant rule belongs to a set of rules defined by the subject of the first relevant rule. In this case, it is unnecessary to recommend the second relevant rule after recommending the first relevant rule. As an optimization, recommendation console 126 may eliminate the second relevant rule entirely.

Figure 5:
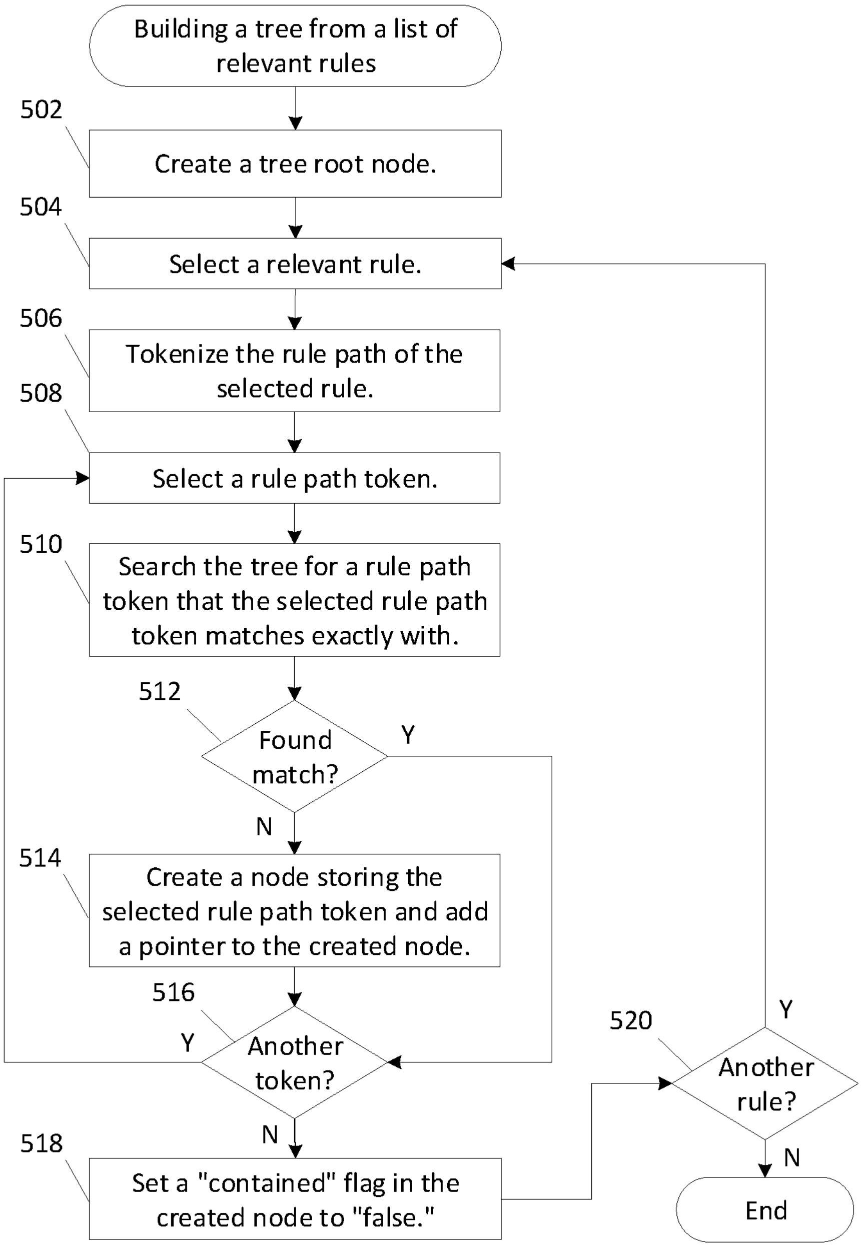
FIG. 5 is a flow diagram of steps carried out by a recommendation console to build a tree data structure from a list of relevant rules, according to an embodiment.

To eliminate overlap of rule paths from the generated relevant rules, build module 130 builds a second tree data structure from the rule paths according to the process of FIG. 5. Then, using the second tree, match module 132 matches rule paths from the second tree to the second tree itself according to the process of FIG. 6. Match module 132 then generates a list of relevant, non-overlapping rules according to the process of FIG. 7.

After generating a list of relevant, non-overlapping rules, recommendation console 126 must determine which of the generated rules the user already has. Recommendation console 126 transmits a request to a sensor manager 116 for security rules 112. After receiving security rules 112, recommendation console 126 removes from the generated rules any rules already included in security rules 112. Recommendation console 126 then recommends the remaining generated rules to the user via UI 124.

For each recommended rule that the user accepts, recommendation console 126 transmits the rule to each sensor manager 116. Each sensor manager 116 then adds the accepted rule to security rules 112 and to the security rules copies 106 of associated VMs 104. Hypervisor sensor agents 114 and VM sensor agents 108 may then apply the accepted rule for the user.

The path tree matching algorithms described herein also have other applications, including recommending permission rules that have corresponding blocking rules. For example, recommendation console 126 may generate permission rules with subjects that are contained by the subjects of a list of blocking rules. To generate such a list, build module 130 builds a tree data structure and hash map from the list of blocking rules similarly to the process of FIG. 2. Match module 132 then generates corresponding permission rules by matching the rule paths of a list of permission rules to the tree similarly to the process of FIG. 3.

The embodiment described herein makes recommendations to a user of a virtualized cloud computing environment 102 in a data center 100. However, recommendation console 126 may also generate relevant rules in other computer systems. For example, in one embodiment, recommendation console 126 may generate relevant rules for a single non-virtualized server. Such a non-virtualized server only contains one sensor agent for detecting the process paths in the server and for applying rules. Such a non-virtualized server also only contains one copy of rules. Recommendation console 126 then applies the same processes of FIGS. 2-3 and 5-7 to generate relevant, non-overlapping rules based on the process paths detected by the single sensor agent and a rule suggestion pool 144.

Figure 2:
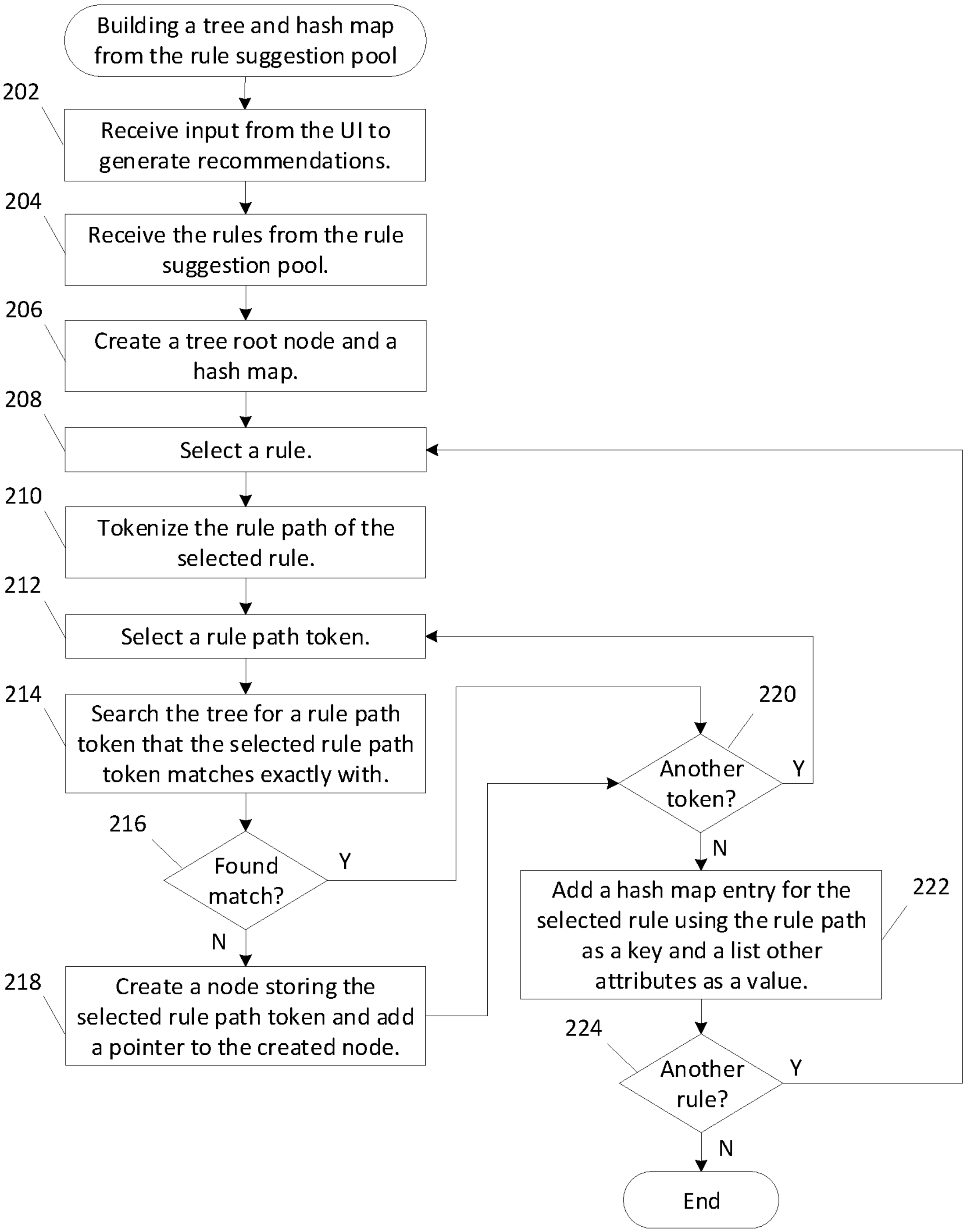
FIG. 2 is a flow diagram of steps carried out by a recommendation console to build a tree data structure and hash map from a rule suggestion pool, according to an embodiment.

FIG. 2 is a flow diagram of steps carried out by recommendation console 126 to build a tree data structure and hash map from rule suggestion pool 144, according to an embodiment. At step 202, recommendation console 126 receives an input by the user via UI 124 to generate rule recommendations. At step 204, VIM 120 transmits a request to virtualization manager 140 for the rules of rule suggestion pool 144. Virtualization manager 140 then transmits the rules to VIM 120 so that recommendation console 126 may access them.

Figure 4:
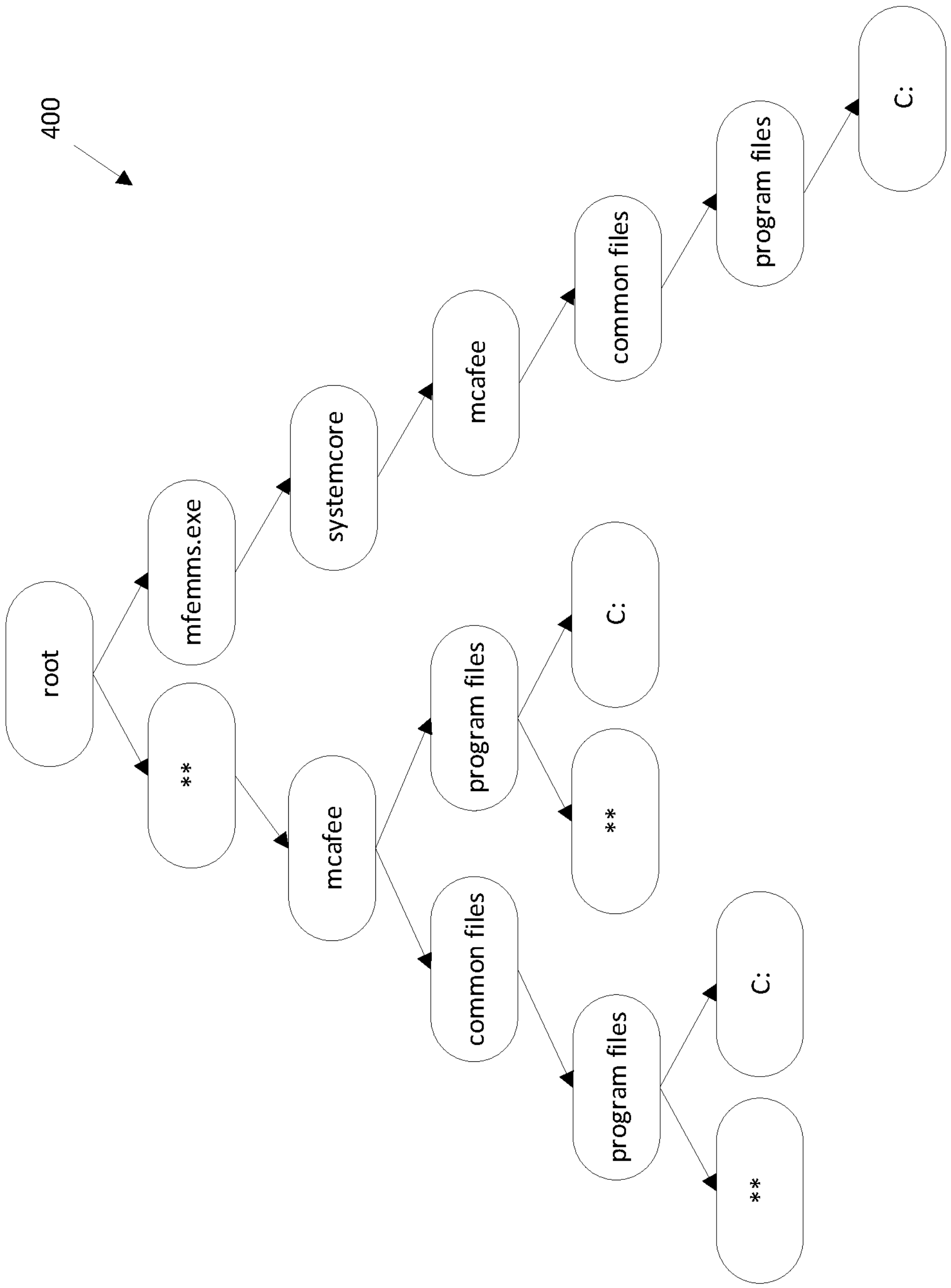
FIG. 4 is an example of a tree data structure that stores rule paths of security rules for generating relevant security rules, according to an embodiment.

At step 206, build module 130 creates a tree data structure with a root node and a hash map. After the method of FIG. 2, the tree data structure will store the rule paths from the rules of rule suggestion pool 144. Each node of the tree data structure will include a file or directory of a rule path or a wildcard as a token. An example of a tree data structure created by the process of FIG. 2 is illustrated in FIG. 4.

The hash map will store the rules by using the rule paths as keys and using lists of other attributes associated with the rules as values. For example, for a hash map entry of a blocking or permission rule, the key is a subject, and the list of attributes includes an operation and an action. For a hash map entry of a reputation rule, the key is a subject, and the list of attributes includes a reputation. Other information may also be stored within the lists of attributes. For example, each rule entry may also include a prevalence value, the prevalence representing the number of customers of a security company that use the associated rule. Recommendation console 126 could then prioritize recommending rules with high prevalence values over recommending rules with low prevalence values.

At step 208, build module 130 selects a rule from the list of rules of rule suggestion pool 144. At step 210, build module 130 tokenizes the rule path of the rule by splitting the rule path at each "\" character. For example, if the rule path of the selected rule is: "C:\program files\common files\mcafee\systemcore\mfemms.exe," then at step 210, build module 130 splits the rule path into the following six tokens: "C:," "program files," "common files," "mcafee," "systemcore," and "mfemms.exe." In the embodiment described herein, tokenization is done by splitting at "\" characters with respect to Windows paths. However, tokenization can also be done with respect to Mac OS and Linux paths by splitting at "l" characters.

At step 212, build module 130 selects a rule path token. In the embodiment described herein, build module 130 builds the tree in reverse order. As such, in the case of the rule path "C:\program files\common files\mcafee\systemcore\mfemms.exe," build module 130 selects the token "mfemms.exe" first and the token "C:" last. In another embodiment, build module 130 can build the tree in normal order.

At step 214, build module 130 searches the tree for a rule path token that the selected rule path token matches exactly with. Specifically, if build module 130 selected the first token (i.e., the last portion) of a rule path at step 212, then at step 214, build module 130 searches from the root node. Otherwise, build module 130 searches from the node of the previous token selected. For example, in the case of the rule path "C:\program files\common files\mcafee\systemcore\mfemms.exe," when build module 130 selects the token "mfemms.exe" at step 212, build module 130 searches for an "mfemms.exe" token already being pointed to by the root. If build module 130 selects the token "systemcore" at step 212, then build module 130 searches for a "systemcore" token already being pointed to by the "mfemms.exe" token. In the embodiment described herein, the token must also match exactly at step 214. For example, the token "mfemms.exe" is not considered an exact match with the token "**."

At step 216, if build module 130 found a match, then the process of FIG. 2 moves to step 220 without creating a new node for the selected token. The process of FIG. 2 thus avoids redundancy in the tree. For example, the tree of FIG. 4 includes the following two paths: "C:\program files\mcafee\" and "\program files\mcafee\." Each of these paths includes the same first three tokens: ","

"mcafee" and "program files." There is no need to create duplicates of these tokens for these paths. As such, after the first of these paths is added to the tree, the first three tokens of that path can be reused for the second path. This reusing of nodes saves significant search time later.

At step 216, if build module 130 did not find a match, then the process of FIG. 2 moves to step 218. At step 218, build module 130 creates a node storing the selected rule path token and adds a pointer to the created node. Specifically, if build module 130 selected the first token (i.e., the last portion) of a rule path at step 212, then build module 130 creates a pointer from the root node. Otherwise, build module 130 creates a pointer from the node of the previous token selected for the current rule path. For example, in the case of the rule path "C:\program files\common files\mcafee\systemcore\mfemms.exe," build module 130 creates a pointer from the root node to the node including "mfemms.exe," a pointer from the node including "mfemm.exe" to the node including "systemcore," and so on.

At step 220, build module 130 determines if there is another rule path token left to select for the current tokenized rule path. If there is another rule path token to select, then the process of FIG. 2 moves back to step 212, and build module 130 selects the next rule path token. Otherwise, if there is not another rule path token to select, then the process of FIG. 2 moves to step 222.

At step 222, build module 130 adds an entry to the hash map for the selected rule using the rule path as a key and a list of the attributes of the rule as a value. At step 224, build module 130 determines if there is another rule left to select from the list of rules of rule suggestion pool 144. If there is another rule left to select, then the process of FIG. 2 moves back to step 208, and build module 130 selects the next rule. Otherwise, if there are no more rules left to select, then the process of FIG. 2 ends.

FIG. 3 is a flow diagram of steps carried out by recommendation console 126 to generate relevant rules from a tree data structure, hash map, and list of user process paths, according to an embodiment. The following description of FIG. 3 refers to the tree of FIG. 4 as the input tree data structure.

At step 302, recommendation console 126 transmits a request to each sensor manager 116 for a list of the process paths of the user of cloud computing environment 102.

At step 304, each sensor manager 116 collects the user process paths detected by hypervisor sensor agent 114 and the VM sensor agents 108 associated with the sensor manager 116. Each sensor manager 116 then transmits the user process paths to recommendation console 126, and recommendation console 126 stores the paths as user process list 128.

At step 306, match module 132 selects a user process path from user process list 128. At step 308, match module 132 tokenizes the selected user process path by splitting the process path at each "\" character. For example, if the selected process path is: "C:\program files\common files\mcafee\systemcore\mfemms.exe," then at step 308, match module 130 splits the user process path into the following six tokens: "C:," "program files," "common files," "mcafee," "systemcore," and "mfemms.exe."

At step 310, match module 132 selects a user process path token. Because build module 130 builds trees in reverse order, match module 132 selects tokens in reverse order. As such, in the case of the user process path "C:\program files\common files\mcafee\systemcore\mfemms.exe," match module 132 selects the token "mfemms.exe" first and the token "C:" last.

At step 312, match module 132 attempts to find a token of the tree that contains the selected user process path token. Specifically, if match module 132 selected the first token (i.e., the last portion) of a user process path at step 310, then at step 312, match module 132 searches from the root node. Otherwise, match module 132 searches from the node including the previous token selected. For example, in the case of the user process path "C:\program files\common files\mcafee\systemcore\mfemms.exe," if match module 132 selected the "mfemms.exe" token at step 310, then match module 132 searches from the root node for a token that contains the "mfemms.exe" token. Furthermore, unlike when building the tree, tokens do not need to exactly match at step 312. A wildcard token may contain another token without exactly matching it. In the tree of FIG. 4, the root is pointing to two tokens containing the "mfemms.exe" token: the "**" wildcard token and the "mfemms.exe" token.

At step 314, if match module 132 did not find a token containing the selected user process path token, then the process of FIG. 3 moves to step 322 without adding the selected rule to a list of relevant rules. There is no rule from rule suggestion pool 144 with a rule path that contains the selected user process path. There is thus no relevant rule for the selected user process path. Otherwise, if match module 132 did find such a token at step 314, then match module 132 traverses the tree by following a pointer to the token, and the method of FIG. 3 moves to step 316.

At step 316, match module 132 determines if there is another token to select from the tokenized user process path. If there is another token to select, then the process of FIG. 3 moves back to step 310, and match module 132 selects the next user process path token. Otherwise, if there is not another token left to select, then the process of FIG. 3 moves to step 318.

When match module 132 determines that there are multiple tokens containing a selected user process path token, match module 132 may need to traverse multiple paths to determine if there is a relevant rule. For example, match module 132 may search FIG. 4 for a rule path that contains the user process path "C:\program files\common files\mcafee\systemcore\mfemms.exe." When selecting the first user process path token "mfemms.exe," match module 132 will find two rule path tokens pointed to by the root that contains the selected token: "" and "mfemms.exe." If match module 132 traverses the tree through the "" token, match module 132 will find the following rule path: "\program files\common files\mcafee," which contains the user process path "C:\program files\common files\mcafee\systemcore\mfemms.exe." However, if there was no such rule path on the left side of the tree, then after traversing the tree by following the "" node, match module 132 would need to traverse the tree by following the "mfemms.exe" token. Match module 132 would then find the rule path "C:\program files\common files\mcafee\systemcore\mfemms.exe." Match module 132** could thus determine that the rule including the rule path "C:\program files\common files\mcafee\systemcore\mfemms.exe" is relevant.

At step 318, because match module 132 was able to traverse the tree to find a rule path containing the selected user process path, there is a relevant rule to recommend to the user. To find the relevant rule, match module 132 locates the rule path in the hash map. Match module 132 determines the associated rule by using the rule path as a key to find other attributes of the rule.

At step 320, match module 132 adds the rule path and the other attributes for the associated rule to a list of relevant rules. At step 322, match module 132 determines if there is another user process path to select. If there is another user process path to select, then the process of FIG. 3 moves back to step 306, and match module 132 selects the next user process path.

Otherwise, if there is not another user process path to select, then the process of FIG. 3 ends. After generating a list of relevant rules according to the process of FIG. 3, recommendation console 126 may eliminate overlap from the list of relevant rules according to the processes of FIGS. 5-7.

FIG. 4 is an example of a tree data structure 400 that stores process paths of security rules for generating relevant security rules, according to an embodiment.

Tree 400 includes five rule paths: "\program files\common files\mcafee," "C:\program files\common files\mcafee," "\program files\mcafee," "C:\program files\mcafee," and "C:\program files\common files\mcafee\systemcore\mfemms.exe."

In the embodiment described herein, tree 400 stores rule paths in reverse order. As such, for the rule path "C:\program files\common files\mcafee\systemcore\mfemms.exe," the root node points to a node including an "mfemms.exe" token instead of pointing to a node including a "C:" token.

In the embodiment described herein, tree 400 also stores a copy of each exact rule path extracted from rule suggestion pool 144. As such, although the rule path "C:\program files\mcafee" belongs to a set of paths defined by the rule path "\program files\mcafee," tree 400 includes tokens for each rule path. However, because each of these rule paths end with "program files\mcafee," each rule path shares the "**," "mcafee," and "program files" tokens. This sharing saves significant search time.

FIG. 5 is a flow diagram of steps carried out by recommendation console 126 to build a tree data structure from a list of relevant security rules, according to an embodiment. Recommendation console 126 builds such a list of relevant rules according to the processes of FIGS. 2 and 3.

Figure 8:
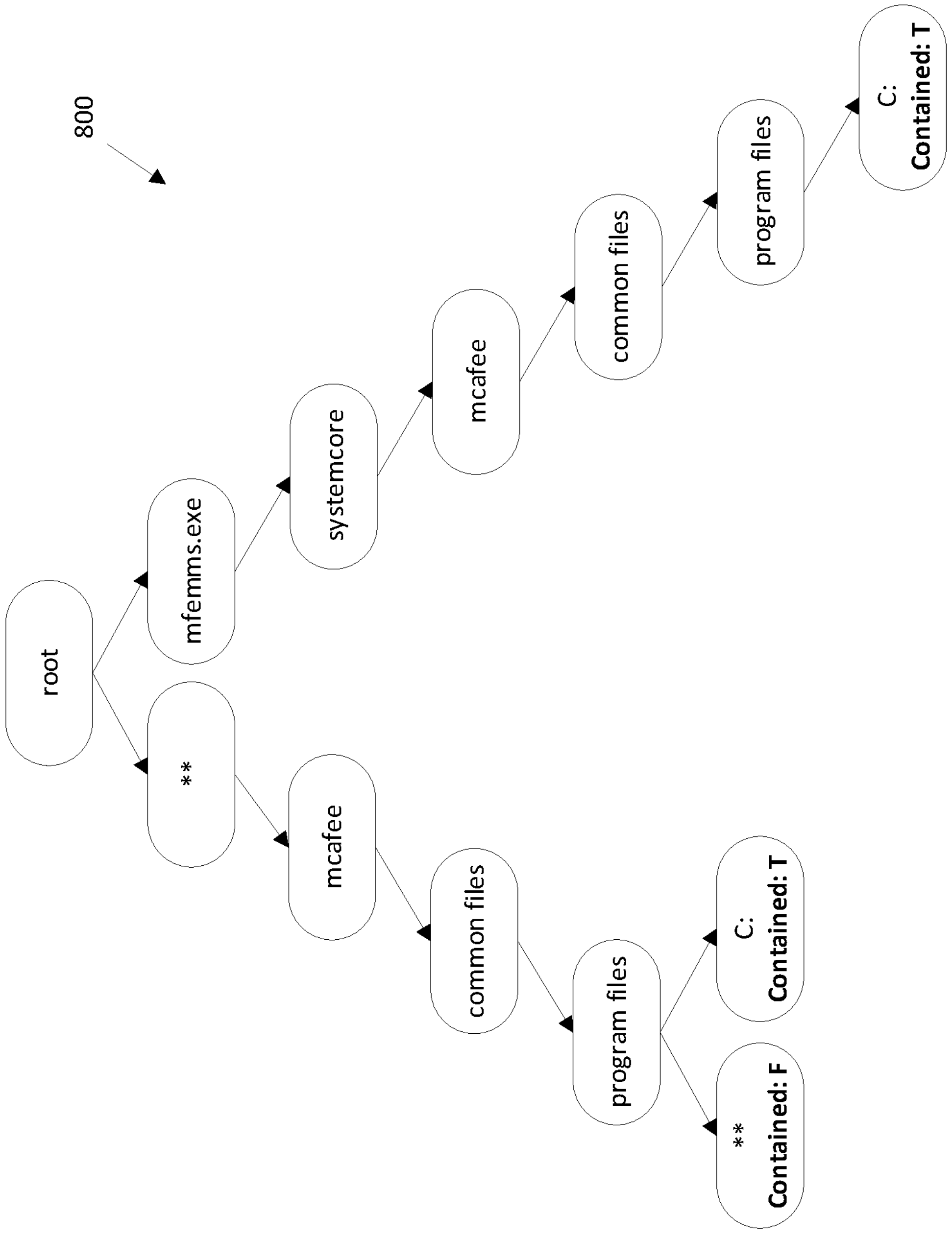
FIG. 8 is an example of a marked tree data structure that stores rule paths of relevant security rules for generating relevant, non-overlapping security rules, according to an embodiment.

At step 502, build module 130 creates a tree data structure with a root node. After the method of FIG. 5, the tree data structure will store the rule paths from the list of relevant rules. Each node of the tree data structure will include a file or directory of a rule path or a wildcard as a token. An example of a tree data structure created by the process of FIG. 5 is illustrated in FIG. 8.

At step 504, build module 130 selects a rule from the list of relevant rules. At step 506, build module 130 tokenizes the rule path of the rule by splitting the rule path at each "\" character. For example, if the rule path of the selected rule is: "C:\program files\common files\mcafee\systemcore\mfemms.exe," then at step 506, build module 130 splits the rule path into the following six tokens: "C:," "program files," "common files," "mcafee," "systemcore," and "mfemms.exe."

At step 508, build module 130 selects a rule path token. In the embodiment described herein, build module 130 builds the tree in reverse order. As such, in the case of the rule path "C:\program files\common files\mcafee\systemcore\mfemms.exe," build module 130 selects the token "mfemms.exe" first and the token "C:" last.

At step 510, build module 130 searches the tree for a rule path token that the selected rule path token matches exactly with. Specifically, if build module 130 selected the first token (i.e., the last portion) of a rule path at step 508, then build module 130 searches from the root node. Otherwise, build module 130 searches from the node of the previous token selected. For example, in the case of the rule path "C:\program files\common files\mcafee\systemcore\mfemms.exe," when build module 130 selects the token "mfemms.exe" at step 508, build module 130 searches for an "mfemms.exe" token already being pointed to by the root. If build module 130 selects the token "systemcore" at step 508, then build module 130 searches for a "systemcore" token already being pointed to by the "mfemms.exe" token.

At step 512, if build module 130 found a match, then the process of FIG. 5 moves to step 516 without creating a new node for the selected token. The process of FIG. 5 thus avoids redundancy in the tree. At step 512, if build module 130 did not find a match, then the process of FIG. 5 moves to step 514.

At step 514, build module 130 creates a node storing the selected rule path token and adds a pointer to the created node. Specifically, if build module 130 selected the first token (i.e., the last portion) of a rule path at step 508, build module 130 creates a pointer from the root node. Otherwise, build module 130 creates a pointer from the node of the previous token selected for the current rule path. For example, in the case of the rule path "C:\program files\common files\mcafee\systemcore\mfemms.exe," build module 130 creates a pointer from the root node to the node including "mfemms.exe," a pointer from the node including "mfemm.exe" to the node including "systemcore," and so on.

At step 516, build module 130 determines if there is another token left to select for the current tokenized rule path. If there is another token to select, then the process of FIG. 5 moves back to step 508, and build module 130 selects the next rule path token. Otherwise, if there is not another rule path token to select, then the process of FIG. 5 moves to step 518.

At step 518, build module 130 sets a "contained" flag for the selected rule path to "false." This setting marks the last node of a rule path (i.e., the node storing the first portion of the rule path). For example, after adding the rule path "C:\program files\common files\mcafee\systemcore\mfemms.exe" to the tree, build module 130 sets a "contained" flag in the node storing the token "C:" to "false." The "contained" flag will be used by match module 132 to eliminate overlapping paths according to the processes of FIGS. 6 and 7.

At step 520, build module 130 determines if there is another rule left to select from the list of relevant rules. If there is another rule left to select, then the process of FIG. 5 moves back to step 504, and build module 130 selects the next rule. Otherwise, if there are no more rules left to select, then the process of FIG. 5 ends.

In the embodiment herein, build module 130 does not generate a new hash map according to the process of FIG. 5. The hash map generated according to the process of FIG. 2 may be reused later. In other embodiments, build module 130 generates a new hash map that only includes the relevant rules processed according to FIG. 5.

Figure 6:
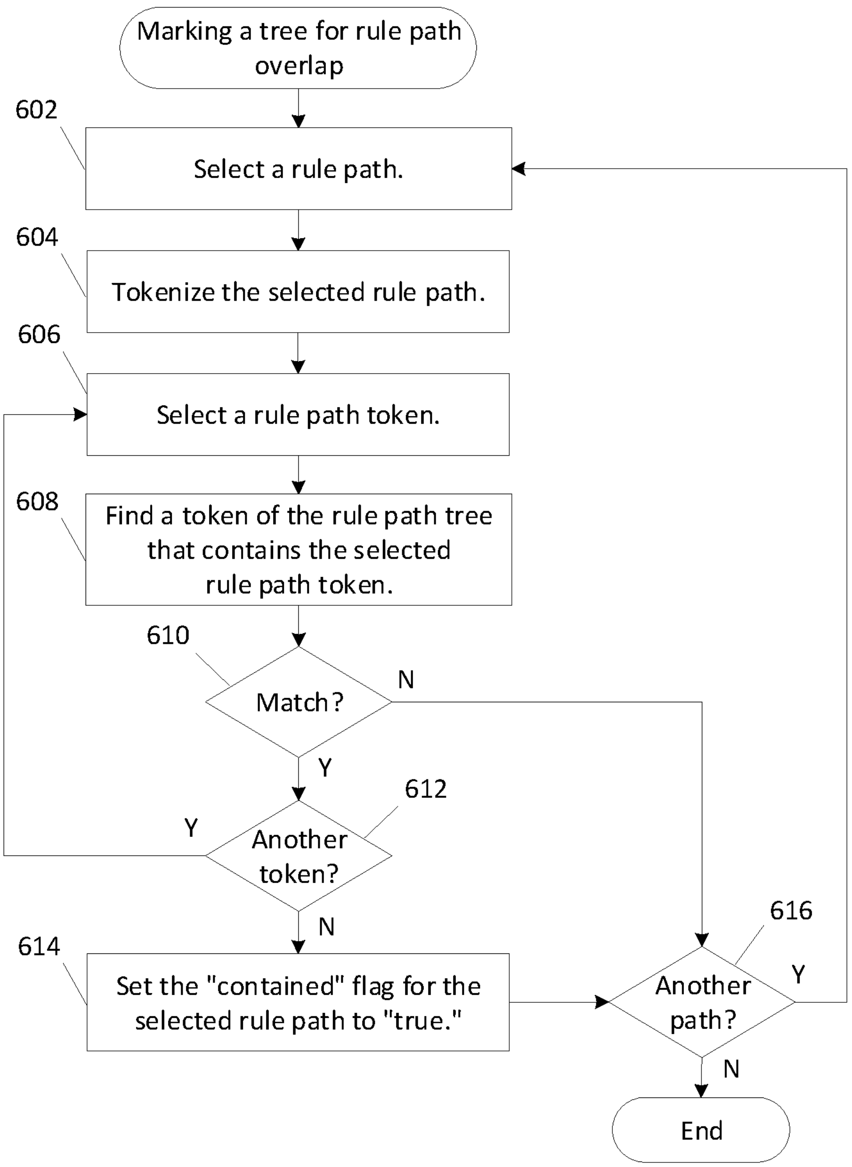
FIG. 6 is a flow diagram of steps carried out by a recommendation console to mark a tree data structure for eliminating overlap of rule paths, according to an embodiment.

FIG. 6 is a flow diagram of steps carried out by recommendation console 126 to mark a tree data structure for eliminating overlap of rule paths, according to an embodiment. The following description of FIG. 6 refers to the tree of FIG. 8 as the input tree data structure.

At step 602, match module 132 selects a rule path from the list of relevant rules used by build module 130 to generate the tree. At step 604, match module 132 tokenizes the selected rule path by splitting the rule path at each "\" character. For example, if the selected rule path is: "C:\program files\common files\mcafee\systemcore\mfemms.exe," then at step 604, match module 130 splits the rule path into the following six tokens: "C:," "program files," "common files," "mcafee," "systemcore," and "mfemms.exe."

At step 606, match module 132 selects a rule path token from the list of tokens generated at step 604. Because build module 130 builds trees in reverse order, match module 132 selects tokens in reverse order. As such, in the case of the rule path "C:\program files\common files\mcafee\systemcore\mfemms.exe," match module 132 selects the token "mfemms.exe" first and the token "C:" last.

At step 608, match module 132 attempts to find a token of the tree that contains the selected rule path token. Specifically, if match module 132 selected the first token (i.e., the last portion) of a rule path at step 606, match module 132 searches from the root node. Otherwise, match module 132 searches from the node including the previous token selected. For example, in the case of the rule path "C:\program files\common files\mcafee\systemcore\mfemms.exe," if match module 132 selected the "mfemms.exe" token at step 606, then match module 132 searches from the root node for a token that contains the "mfemms.exe." Furthermore, unlike when building the tree, a match does not need to be exact. A token may match with a wildcard. In the tree of FIG. 8, the root is pointing to two tokens containing the "mfemms.exe" token: the "**" wildcard token and the "mfemms.exe" token.

At step 610, if match module 132 did not find a token containing the selected rule path token, then the process of FIG. 6 moves to step 616 without changing the "contained" flag of any rule paths to "true." There is no rule path in the tree containing the selected rule path. Otherwise, if match module 132 did find such a token, then match module 132 traverses the tree by following a pointer to the found token, and the method of FIG. 6 moves to step 612.

At step 612, match module 132 determines if there is another token to select from the tokenized rule path. If there is another token to select, then the process of FIG. 6 moves back to step 606, and match module 132 selects the next rule path token. Otherwise, if there is not another token left to select, then the process of FIG. 6 moves to step 614.

At step 614, because match module 132 was able to traverse the tree to find a rule path containing the selected rule path, match module 132 sets the "contained" flag for the selected rule path to "true." As discussed below, setting the "contained" flag to "true" is necessary for later collecting all the rule paths that are not contained.

Of course, match module 132 only sets the "contained" flag to "true" if it finds a path that contains the selected rule path but that does not exactly match it. For example, the tree of FIG. 8 includes the rule path "C:\program files\common files\mcafee\systemcore\mfemms.exe." If match module 132 selects this rule path at step 602, then match module 132 does not set the "contained" flag for this rule path to "true" when traversing the right side of the tree. However, when traversing the left side of the tree, match module 132 will find two paths that each contain the selected rule path despite not exactly matching it. After finding either, match module 132 will set the "contained" flag for "C:\program files\common files\mcafee\systemcore\mfemms.exe" to "true."

At step 616, match module 132 determines if there is another rule path to select. If there is another rule path to select, then the process of FIG. 6 moves back to step 602, and match module 132 selects the next rule path. Otherwise, if there is not another rule path to select, then the process of FIG. 6 ends.

Figure 7:
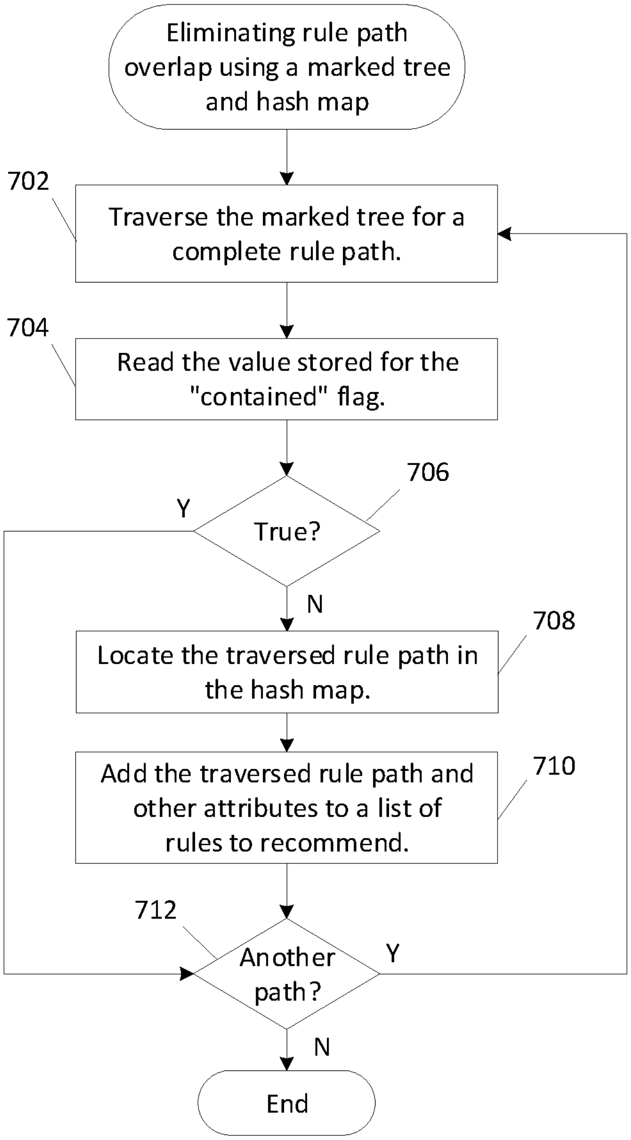
FIG. 7 is a flow diagram of steps carried out by a recommendation console to generate a list of non-overlapping rules from a marked tree data structure and hash map, according to an embodiment.

After the process of FIG. 6, recommendation console 126 can eliminate overlap of rule paths according to the process of FIG. 7.

FIG. 7 is a flow diagram of steps carried out by recommendation console 126 to generate a list of non-overlapping rules from a marked tree data structure and hash map. The following description of FIG. 7 refers to the tree of FIG. 8 as the input tree data structure. The tree is marked according to the process of FIG. 6. The input hash map is generated according to the process of FIG. 2.

At step 702, match module 132 traverses the marked tree for a complete rule path. At step 704, match module 132 reads the value stored for the "contained" flag.

At step 706, if the value stored for the "contained" flag is "true," then the process of FIG. 7 moves to step 712 without match module 132 adding the rule associated with the traversed rule path to the list of rules to recommend. The value "true" signifies that the traversed rule path belongs to a set of paths defined by another rule path of the marked tree. It is thus unnecessary to recommend the associated rule.

If the value stored for the "contained" flag is "false," then the process of FIG. 7 moves to step 708. Because the traversed rule path is not contained by another rule path, the associated relevant rule should be recommended. At step 708, match module 132 locates the traversed rule path in the hash map. Match module 132 determines the associated rule by using the rule path as a key to find other attributes of the associated rule. At step 710, match module 132 adds the traversed rule path and the other attributes for the associated rule to a list of relevant, non-overlapping rules.

At step 712, match module 132 determines if there is another rule path to traverse. If there is another rule path to traverse, then the process of FIG. 7 moves back to step 702, and match module 132 traverses the marked tree for another rule path. Otherwise, if there is not another rule path to traverse, then the process of FIG. 7 ends. After the process of FIG. 7, recommendation engine 126 may recommend any relevant, non-overlapping rules that the user does not already have.

FIG. 8 is an example of a marked tree data structure 800 that stores rule paths of relevant security rules for generating relevant, non-overlapping security rules, according to an embodiment. The tree of FIG. 8 includes three relevant rule paths "\program files\common files\mcafee," "C:\program files\common files\mcafee**," and "C:\program files\common files\mcafee\systemcore\mfemms.exe."

The first path "\program files\common files\mcafee" is not contained by either of the other rule paths. As such, the "contained" flag for the first path is set to "false." The relevant security rule associated with the first path should thus be recommended.

The second path "C:\program files\common files\mcafee**" belongs to a set of paths defined by the first rule path. As such, the "contained" flag for the second path is set to "true." For optimization, the relevant security rule associated with the second path should not be recommended.

The third path "C:\program files\common files\mcafee\systemcore\mfemms.exe" belongs to a set of paths defined by both the first and second rule paths. As such, the "contained" flag for the third path is set to "true." For optimization, the relevant security rule associated with the third path should not be recommended.

FIG. 9 is an example of Python code that may be executed by recommendation console 126 to build a tree data structure, according to an embodiment. Recommendation console 126 may first execute the code of FIG. 9 to build a tree from rule suggestion pool 144. Recommendation console 126 may later execute the code of FIG. 9 again to build a tree from a list of relevant rules.

Lines 910 are a class "TreeNode" that build module 130 employs to instantiate a node of a tree. The "TreeNode" class includes a constructor for instantiating a node from a path token.

Lines 920 are a class "PathTree" that build module 130 employs to instantiate and build a tree from nodes. The "PathTree" class 920 includes a constructor 930 for instantiating a tree with a single node. According to the embodiments described herein, build module 130 instantiates a tree with a root node.

The "PathTree" class 920 also includes a "build tree" method 940 for building a tree. Build module 130 tokenizes a rule path by splitting the rule path at each "\" character. Build module 130 then constructs a tree by starting at a root node and adding each token in reverse order. If a node may be re-used from a previous rule path, then build module 130 re-uses the node. Build module 130 thus allows rule paths to share nodes, which saves significant search time later.

FIG. 10 is an example of Python code that may be executed by recommendation console 126 to initialize parameters for generating relevant rules, according to an embodiment. Recommendation console 126 would use the code of FIG. 10 after generating a tree data structure and hash map from rule suggestion pool 144. For example, the code of FIG. 10 includes tokenizing a user process path by splitting the user process path at each "\" character.

FIG. 11 is an example of Python code that may be executed by recommendation console 126 to generate a rule path for a relevant rule from a tree data structure and list of user process paths, according to an embodiment. Recommendation console 126 would use the code of FIG. 11 after initializing parameters according to the code of FIG. 10. The code of FIG. 11 iterates over each user process path token of a user process path.

At lines 1110, match module 132 selects a user process path token in reverse order. Match module 132 then selects a level of the tree based on the current user process path token selected. When match module 132 selects the first user process path token, i.e., the last portion of the user process path, match module 132 selects the first level of the tree from the root. Otherwise, match module 132 selects the next level of the tree from the node of the previous token selected.

At lines 1120, match module 132 searches the selected level of the tree for a node with a rule path token that contains the selected user process path token. For example, a "*" token contains any selected user process path token. If match module 132 does not find a node with such a rule path token, then there is no relevant rule based on the user process path. Otherwise, if match module 132 does find such a rule path token, then match module 132 moves to the next user process path token.

If match module 132 is able to find a rule path that contains the user process path, then after using the code of FIG. 11, match module 132 adds a new relevant rule to a list of relevant rules. For example, match module 132 may collect attributes associated with the relevant rule from a hash map that maps rule paths to lists of attributes associated with rules. Match module 132 may thus use the hash map to add the rule path and the attributes associated with the rule to the list of relevant rules. Otherwise, if match module 132 is not able to find a rule path that contains the user process path, then match module 132 will not add an entry.

FIG. 12 is an example of Python code that may be executed by recommendation console 126 to build a tree data structure from a list of relevant rules, mark the tree data structure, and generate a list of non-overlapping rule paths from the marked tree data structure, according to an embodiment. Recommendation console 126 would use the code of FIG. 12 after generating a list of relevant rules.

At lines 1210, build module 130 creates a tree with a root node. Build module 130 also initializes a data structure for storing "contained" flags and associating the "contained" flags with rule paths. At lines 1220, build module 130 adds each rule path from a list of relevant rule paths to the tree. Build module 130 also stores the value "False" for the "contained" flag of each relevant rule path.

At lines 1230, match module 132 selects each rule path included in the tree. For each selected rule path, match module 132 searches the tree for a different rule path containing the selected rule path. For each rule path that is contained by another rule path in the tree, match module 132 changes the "contained" flag for the contained rule path to "True."

At lines 1240, match module 132 selects each rule path for which the "contained" flag is still set to "False." Each such rule path is not contained by any other rule path in the tree. As such, match module 132 adds each such rule path to a list of non-overlapping rule paths. After using the code of FIG. 12, match module 132 may generate a list of relevant, non-overlapping rules to recommend from the list of non-overlapping rule paths and from attributes of the rules associated with those non-overlapping rule paths.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, network-attached storage (NAS) systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest operating system (OS) that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of generating and applying relevant security rules for a virtual machine (VM), comprising:

extracting from a pool of security rules, a first set of file system paths, wherein each file system path in the first set of file system paths specifies one or more locations in a file system, the one or more locations corresponding to executable files;

building a first tree data structure from the first set of file system paths;

collecting a second set of file system paths from the VM, wherein each file system path in the second set of file system paths specifies a location in a file system of the VM, the location corresponding to an executable file of a process running in the VM;

compiling the relevant security rules for the VM by traversing the first tree data structure according to the second set of file system paths; and applying the compiled security rules to the VM.

2. The method of claim 1, wherein the compiled security rules include a third set of file system paths, the third set of file system paths being a subset of the second set of file system paths, and wherein the method further comprises:

building a second tree data structure from the third set of file system paths; and eliminating security rules from the compiled security rules by traversing the second tree data structure according to the third set of file system paths.

3. The method of claim 2, wherein the first and second tree data structures comprise nodes, each node of the first tree data structure including a token that represents a partial path of a file system path in the first set of file system paths, and each node of the second tree data structure including a token that represents a partial path of a file system path in the third set of file system paths.

4. The method of claim 2, wherein the first tree data structure includes a first root node and a first intermediate node that is directly below the first root node and includes a token that represents the rightmost portion of a file system path in the first set of file system paths, and the second tree data structure includes a second root node and a second intermediate node that is directly below the second root node and includes a token that represents the rightmost portion of a file system path in the third set of file system paths.

5. The method of claim 2, wherein the compiled security rules include blocking and permission rules, each blocking rule and each permission rule specifying a subject, a type of operation, and an action.

6. The method of claim 2, wherein the compiled security rules include reputation rules, each reputation rule specifying a subject and a reputation.

7. The method of claim 2, wherein each security rule that is eliminated defines at least one file system path that is defined by a security rule that is not eliminated.

8. A non-transitory computer readable medium comprising instructions that are executable in a computer system, wherein the instructions when executed cause the computer system to carry out a method of generating and applying relevant security rules for a virtual machine (VM), said method comprising:

extracting from a pool of security rules, a first set of file system paths, wherein each file system path in the first set of file system paths specifies one or more locations in a file system, the one or more locations corresponding to executable files;

building a first tree data structure from the first set of file system paths;

collecting a second set of file system paths from the VM, wherein each file system path in the second set of file system paths specifies a location in a file system of the VM, the location corresponding to an executable file of a process running in the VM;

compiling the relevant security rules for the VM by traversing the first tree data structure according to the second set of file system paths; and applying the compiled security rules to the VM.

9. The non-transitory computer readable medium of claim 8, wherein the compiled security rules include a third set of file system paths, the third set of file system paths being a subset of the second set of file system paths, and wherein the method further comprises:

building a second tree data structure from the third set of file system paths; and eliminating security rules from the compiled security rules by traversing the second tree data structure according to the third set of file system paths.

10. The non-transitory computer readable medium of claim 9, wherein the first and second tree data structures comprise nodes, each node of the first tree data structure including a token that represents a partial path of a file system path in the first set of file system paths, and each node of the second tree data structure including a token that represents a partial path of a file system path in the third set of file system paths.

11. The non-transitory computer readable medium of claim 9, wherein the first tree data structure includes a first root node and a first intermediate node that is directly below the first root node and includes a token that represents the rightmost portion of a file system path in the first set of file system paths, and the second tree data structure includes a second root node and a second intermediate node that is directly below the second root node and includes a token that represents the rightmost portion of a file system path in the third set of file system paths.

12. The non-transitory computer readable medium of claim 9, wherein the compiled security rules include blocking and permission rules, each blocking rule and each permission rule specifying a subject, a type of operation, and an action.

13. The non-transitory computer readable medium of claim 9, wherein the compiled security rules include reputation rules, each reputation rule specifying a subject and a reputation.

14. The non-transitory computer readable medium of claim 9, wherein each security rule that is eliminated defines at least one file system path that is defined by a security rule that is not eliminated.

15. A computer system comprising:
- an infrastructure management server executing instructions to generate and apply relevant security rules for a virtual machine (VM), wherein the instructions cause the infrastructure management server to carry out a method comprising:
  - extracting from a pool of security rules, a first set of file system paths, wherein each file system path in the first set of file system paths specifies one or more locations in a file system, the one or more locations corresponding to executable files;
  - building a first tree data structure from the first set of file system paths;
  - collecting a second set of file system paths from the VM, wherein each file system path in the second set of file system paths specifies a location in a file system of the VM, the location corresponding to an executable file of a process running in the VM;
  - compiling the relevant security rules for the VM by traversing the first tree data structure according to the second set of file system paths; and
  - applying the compiled security rules to the VM.

16. The computer system of claim 15, wherein the compiled security rules include a third set of file system paths, the third set of file system paths being a subset of the second set of file system paths, and wherein the method further comprises:
- building a second tree data structure from the third set of file system paths; and
- eliminating security rules from the compiled security rules by traversing the second tree data structure according to the third set of file system paths.

17. The computer system of claim 16, wherein the first and second tree data structures comprise nodes, each node of the first tree data structure including a token that represents a partial path of a file system path in the first set of file system paths, and each node of the second tree data structure including a token that represents a partial path of a file system path in the third set of file system paths.

18. The computer system of claim 16, wherein the first tree data structure includes a first root node and a first intermediate node that is directly below the first root node and includes a token that represents the rightmost portion of a file system path in the first set of file system paths, and the second tree data structure includes a second root node and a second intermediate node that is directly below the second root node and includes a token that represents the rightmost portion of a file system path in the third set of file system paths.

19. The computer system of claim 16, wherein the compiled security rules include blocking and permission rules, each blocking rule and each permission rule specifying a subject, a type of operation, and an action.

20. The computer system of claim 16, wherein the compiled security rules include reputation rules, each reputation rule specifying a subject and a reputation.

* * * * *